United States Patent [19]

Asano et al.

[11] Patent Number: 5,562,523
[45] Date of Patent: Oct. 8, 1996

[54] METHOD AND APPARATUS FOR GRINDING A WORKPIECE

[75] Inventors: Hiroaki Asano, Okazaki; Takao Yoneda; Takayuki Hotta, both of Nagoya, all of Japan

[73] Assignee: Toyoda Koki Kabushiki Kaisha, Kariya, Japan

[21] Appl. No.: 316,373

[22] Filed: Sep. 30, 1994

[30] Foreign Application Priority Data

Sep. 30, 1993 [JP] Japan ..................... 5-245023

[51] Int. Cl.$^6$ ................ B24B 49/00; B24B 51/00
[52] U.S. Cl. .................... 451/1; 451/5; 451/11
[58] Field of Search .................... 451/5, 1, 8, 9, 451/10, 11, 55, 58, 14, 21, 50, 51, 407, 410

[56] References Cited

U.S. PATENT DOCUMENTS

| | | | |
|---|---|---|---|
| 4,293,913 | 10/1981 | Nishimura et al. | 451/8 |
| 4,484,413 | 11/1984 | Yamamoto et al. | 451/5 |
| 4,490,946 | 1/1985 | Tsujiuchi et al. | 451/11 |
| 4,615,149 | 10/1986 | Yoneda et al. | 451/5 |
| 4,648,025 | 3/1987 | Yoneda et al. | 451/11 |
| 4,773,187 | 9/1988 | Ohta et al. | 451/5 |
| 4,815,000 | 3/1989 | Yoneda et al. | 451/5 |
| 4,873,793 | 10/1989 | Asano et al. | 451/5 |
| 4,884,373 | 12/1989 | Suzuki et al. | 451/5 |
| 4,963,805 | 10/1990 | Suzuki et al. | 451/5 |
| 5,027,562 | 7/1991 | Kobayashi et al. | 451/11 |
| 5,072,550 | 12/1991 | Matsumoto | 451/11 |
| 5,076,022 | 12/1991 | Ohta et al. | 451/5 |
| 5,237,779 | 8/1993 | Ota | 451/5 |
| 5,315,789 | 5/1994 | Takashi | 451/11 |
| 5,355,633 | 10/1994 | Ishikawa et al. | 451/10 |
| 5,392,566 | 2/1995 | Wedeniwski | 451/58 |

*Primary Examiner*—Bruce M. Kisliuk
*Assistant Examiner*—Derris Banks
*Attorney, Agent, or Firm*—Oblon, Spivak, McClelland, Maier & Neustadt, P.C.

[57] ABSTRACT

In a grinding method wherein a rotating workpiece and a rotating grinding wheel are relatively moved toward and away from each other and wherein at least three of rough, fine and finish grinding step are performed successively at high, medium and low infeed rates respectively for grinding the workpiece, the grinding wheel is retracted to a back-off position at the end of the rough grinding step. To calculate the back-off position, a first residual grinding amount which is left unground due to the bending of the workpiece is calculated based upon the diameter of the workpiece and the position of the grinding wheel which are detected respectively by an in-process measuring device and an absolute encoder at the end of the rough grinding step, and a second residual grinding amount of the workpiece at the end of the fine grinding step is estimated based upon the first residual grinding amount and a third residual grinding amount which has been calculated at the end of the finish grinding step for a preceding workpiece portion. The back-off position is calculated from the difference between the first and second residual grinding amounts.

12 Claims, 5 Drawing Sheets

METHOD AND APPARATUS FOR GRINDING A WORKPIECE

BACKGROUND OF THE INVENTION

1. Field of the Invention

The present invention relates to an improved method and apparatus for grinding a workpiece having a cylindrical shape.

2. Discussion of the Prior Art

Heretofore, in a conventional cylindrical grinding machine, a wheel head supporting a rotating grinding wheel 19 is advanced toward a workpiece W, so that an outer peripheral surface of the workpiece W which is supported between a center 15a of a work head and a center 16a of a tailstock, is ground with the grinding wheel 19, as shown in FIG. 1. As shown in FIG. 2, the wheel head is infed as reducing its infeed rate in order such as at a rough grinding infeed rate G1, a fine grinding infeed rate G2 and a finish grinding infeed rate G3. Therefore, the workpiece W is ground with the grinding wheel 19, wherein the position of the wheel head is represented by the solid-line G. Further, to compare the position of the wheel head with the diameter of a workpiece portion Wa of the workpiece W, the diameter of the workpiece portion Wa is converted into a corresponding value which is represented as the position of the wheel head. The corresponding value decreases as indicated by the broken-line H as the grinding operation proceeds. In such a grinding operation, for higher accuracy, the machining is carried out with the diameter of the workpiece W being measured by an in-process measuring device. Namely, when the diameter of the workpiece portion Wa reaches a rough grinding end diameter d1, the infeed rate is changed from the rough grinding infeed rate G1 to the fine grinding infeed rate G2 and then, when the diameter thereof reaches a fine grinding end diameter d2, the infeed rate is changed from the fine grinding infeed rate G2 to the finish grinding infeed rate G3. Further, when the diameter reaches a finish diameter D, the grinding operation comes to end and the wheel head is retracted.

However, in the prior art grinding apparatus, the grinding operation causes the workpiece and supporting member thereof to be bent, whereby the workpiece has an amount left not ground. This amount is called residual grinding amount hereinafter throughout the specification. As represented by the solid-line I in FIG. 2, the residual grinding amount at each of the grinding steps is saturated to a certain value with the progress of the operation. Particularly, it is required that the residual grinding amount is saturated to the certain value upon completion of the finish grinding step, for a desired surface roughness and a desired roundness of the surface. Further, although the sharpness of the grinding wheel is high immediately after the truing operation, it is gradually deteriorated as the grinding amount of the workpiece increases. This causes the cycle time for grinding one workpiece to change to a relatively large extent. In the case that a machining line having plural machine tools connected in line machines the workpieces, if there occurs such change of the machining cycle time in at least one of the plural machine tools, then the cycle time of the entire machining line is adversely affected, whereby the efficiency of the machining line is lowered. Therefore, the change of the machining cycle time has to be eliminated.

The change of the machining cycle time is largely contributed by that in the finish grinding step (if any, the fine grinding step prior thereto) with a slow infeed rate. Therefore, the machining cycle time change could be diminished if an attempt is made to shorten the time required for the finish grinding step (and the preceding fine grinding step), in other words, to make the workpiece diameter at the end of rough (or the successive fine) grinding step be approximated to a finish diameter.

However, in this manner, the residual grinding amount cannot be saturated during the finish grinding step, thereby resulting in low degrees of the surface roughness and roundness of the ground surface.

SUMMARY OF THE INVENTION

Accordingly, it is a primary object of the present invention to provide an improved grinding method and apparatus capable of grinding workpieces in high degree of surface roughness and roundness without bringing about the substantial fluctuation in the machining cycle times for the workpieces.

It is another object of the present invention to provide an improved grinding method and apparatus of the aforementioned character which is capable of decreasing the machining cycle time for workpieces.

Briefly, in a grinding method wherein a rotating workpiece and a rotating grinding wheel are relatively moved toward and away from each other and wherein at least two of first and second grinding steps are performed successively at high and low infeed rates respectively for grinding the workpiece, the grinding wheel is retracted to a back-off position at the end of the first grinding step. To calculate the back-off position, a first residual grinding amount which is left unground due to the bending of the workpiece is calculated based upon the diameter of the workpiece and the position of the grinding wheel which are detected respectively by an in-process measuring device and an absolute encoder at the end of the rough grinding step. The back-off position is calculated based upon the first residual grinding amount and a second residual grinding amount which the workpiece may have at the end of the second grinding step.

With this configuration, since the back-off position is determined taking the second residual grinding amount which the workpiece would have at the end of the second grinding step, so that the second grinding time taken until the diameter of the workpiece portion reaches a second grinding end diameter can advantageously be shortened.

In another aspect of the present invention, there are performed in turn at least first to third grinding steps for grinding the workpiece portion. In this modified case, the second residual grinding amount is, preferably, estimated based upon the first residual grinding amount and a third residual grinding amount which has been calculated and stored at the end of the third grinding step for the preceding workpiece or workpiece portion. The residual grinding amount that the workpiece portion has at the very beginning of the second grinding step coincides with that which it has at the end of the same grinding step; namely, substantially constant residual grinding amount is maintained throughout the second grinding step, the workpiece can be precisely ground by the amount through which the grinding wheel is infed.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, in which.

DETAILED DESCRIPTION OF THE PREFERRED EMBODIMENT

Figure 3:
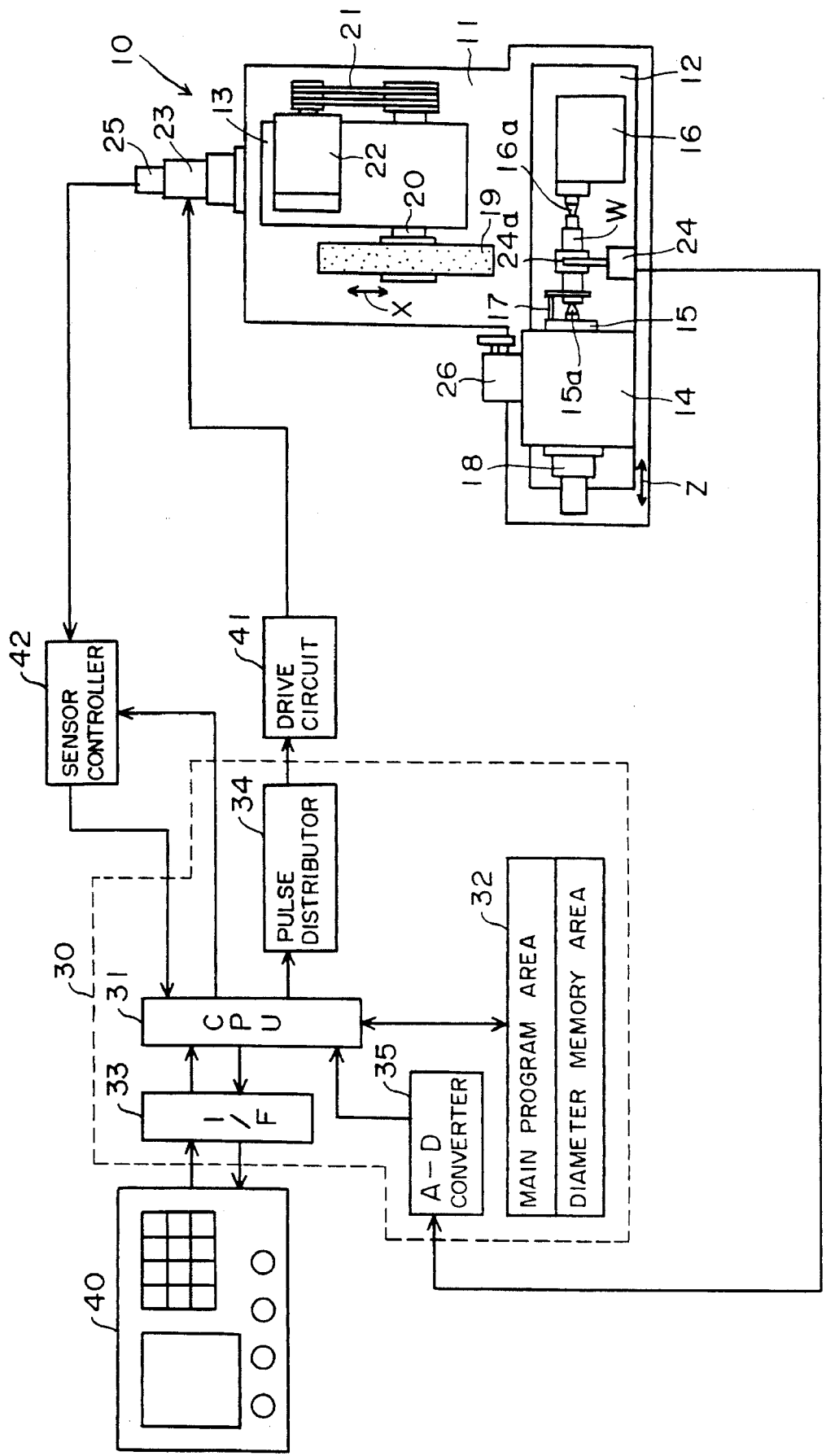
FIG. 3 is a block diagram of a numerical controller, also illustrating a plan view of a grinding machine according to the present invention.

Referring now to FIG. 3, numeral 10 indicates a grinding machine in which a table 12 is slidably mounted on a bed 11 in a Z-axis direction (a feed mechanism for the table 12 is not shown). Mounted on the table 12 are a work head 14 which rotatably carries a work spindle 15 driven by a motor 18 arranged thereon, and a tailstock 16. Both ends of a workpiece W are supported by a center 15a of the work spindle 15 and a center 16a of the tailstock 16. The workpiece W is engaged with a drive pin 17 protruding from the work spindle 15 for bodily rotation with the work spindle 15.

Further, slidably mounted on the bed 11 in an X-axis direction perpendicular to the Z-axis is a wheel head 13, on which a grinding wheel 19 such as CBN grinding wheel is rotatably supported by a wheel spindle 20 which is driven by a motor 22 through a V-belt mechanism 21. A servomotor 23 provided on the bed 11 is controlled by a drive circuit 41 which responds to feed pulses distributed from a pulse distributor 34 of a numerical controller 30. The wheel head 13 is moved in the X-axis direction through a ball screw mechanism (not shown). A position detector 25 such as absolute encoder detects the rotational angular position of the servomotor 23 relative to a reference angular position. Since the reference angular position is so set that the front edge of the grinding surface of the grinding wheel 19 is located on the rotational axis of the workpiece, in other wards, since it is set to indicate zero when the grinding wheel 19 grinds the workpiece of zero diameter, the absolute position of the wheel head 13 is detected by the position detector 25. A detected value of the position detector 25 is input to the numerical controller 30 through a sensor controller 42. An in-process measuring device 24 mounted on the table 12 continuously directly measures the diameter of one portion being ground of the workpiece W by engaging a pair of probes 24a thereof with the one portion. A signal (analog signal) indicating the measured diameter is input to the numerical controller 30.

The numerical controller 30 comprises a central processing unit (CPU) 31 for controlling the grinding machine 10, a memory 32, an interface 33, and the pulse distributor 34 for distributing drive pulses in response to commands from the CPU 31. The CPU 31 is connected with the measuring device 24 through an A-D converter 35 for converting a signal measured by the measuring device 24 into digital signals corresponding thereto. The CPU 31 also is connected with the sensor controller 42. Connected with the interface 33 is an input device 40 for inputting various commands and parameters which will be described hereinafter.

In the memory 32, there are formed a main or system program area storing a system control program for controlling the grinding machine 10, and a data memory area for storing a present diameter of the grinding wheel 19 and various other data which will be described hereinafter. The diameter of the grinding wheel 19 stored in the data memory area is updated each time the grinding wheel 19 is trued by a truing device 26 on the work head 14.

Next, the operation of the apparatus as constructed above will now be described with reference to FIGS. 3 through 6.

Figure 4:
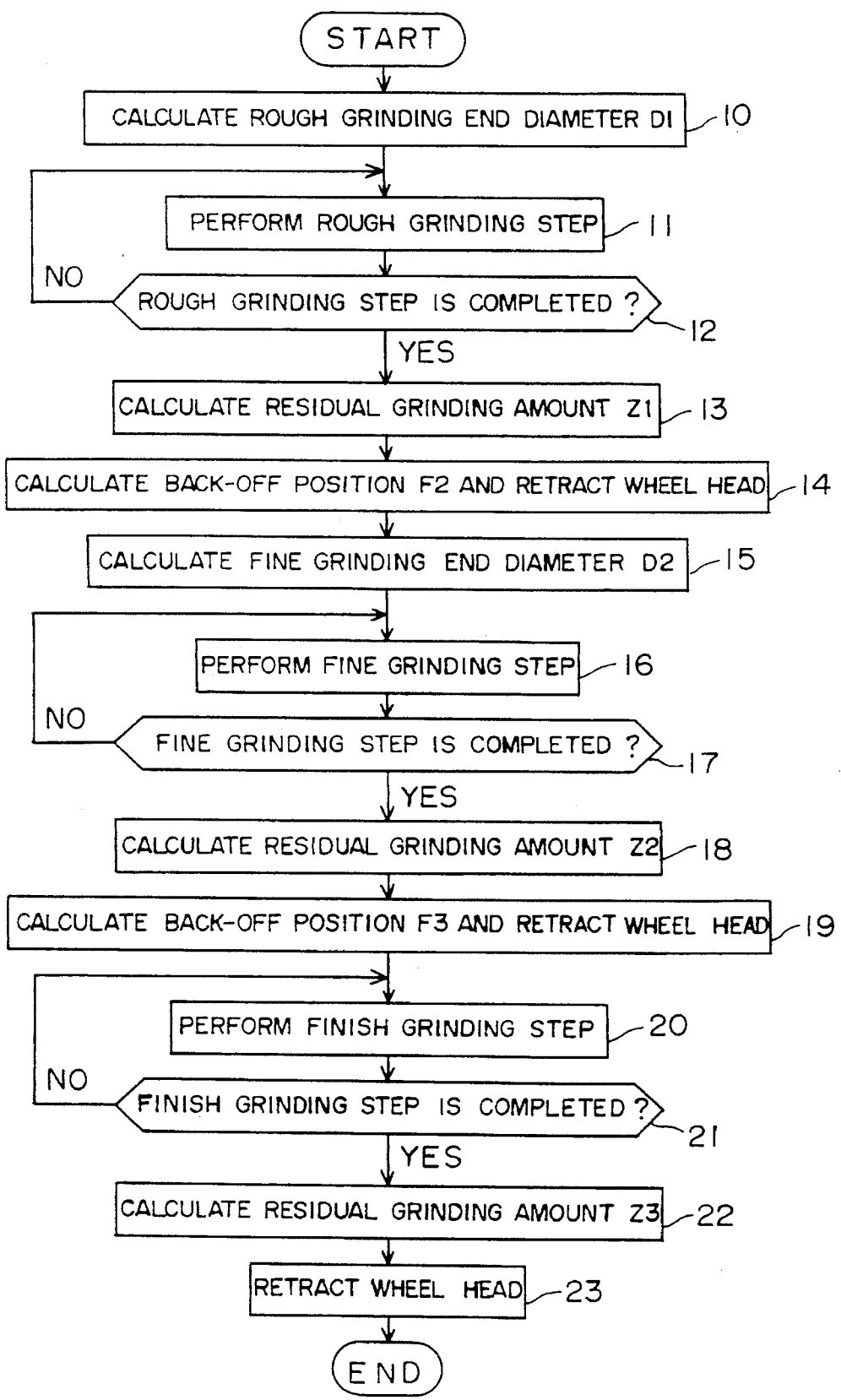
FIG. 4 is a flowchart showing a program executed by a CPU 31 shown in FIG. 3, for controlling the grinding machine.

FIG. 4 shows a flowchart of the system control program for controlling the grinding machine 10. When the grinding machine 10 is operated in response to a start command input from the input device 40, the grinding operation is performed according to the system control program shown in FIG. 4. Before a rough grinding step is started, in step 10, the CPU 31 of the numerical controller 30 calculates a rough grinding end diameter D1 from the following equation.

$$D1 = D + U1 \cdot 1 + U2 \cdot N2 + U2 \cdot 1 + U3 \cdot N3 \quad (1)$$
$$= D2 + U1 \cdot 1 + U2 \cdot N2$$

Where:

D represents a target finish diameter of a portion to be ground of workpiece W; and U1, U2 and U3 respectively represent infeed amounts of grinding wheel 19 per rotation of workpiece W in rough, fine and finish grinding steps.

It is to be noted that the infeed amounts U1, U2 and U3 are respectively obtained by dividing the infeed rates of the wheel head 13 by rotational speeds of the workpiece W in the respective grinding steps. Further, N2 and N3 represent the number of rotations through which the workpiece W has to be rotated in fine and finish grinding step so as to grind the portion to the target finish diameter. Moreover, D2 represents a fine grinding end diameter which is explained hereinafter. In this embodiment, the finish target diameter D and the infeed rates and rotational speeds in the respective grinding steps are stored in advance by means of the input device 40 in the data memory area of the memory 32. The respective infeed amounts U1, U2 and U3 per rotation of the workpiece W are calculated from the stored infeed rates and rotational speeds and then, are converted into the reduction amount in workpiece diameter.

After the CPU 31 calculates the rough grinding end diameter D1 as described above, the rough grinding step is carried out in step 11. Prior to the execution of step 11, the grinding wheel 19 is rotated by the motor 22 and the workpiece W supported between the work head 14 and the tailstock 16 is rotated by the motor 18 at a rotational speed for rough grinding. In this situation, step 11 is executed, wherein the wheel head 13 is advanced at a rough grinding infeed rate as shown by the solid-line A1 in FIG. 5. More specifically, for the rough grinding infeed the CPU 31 in step 11 decodes an instruction for advancing the wheel head 13 at a rapid infeed rate which instruction is written in a numerical control program (not shown), and outputs a pulse distribution command and a rapid feed rate command designated by the decoded instruction to the pulse distributor 34. That is, the CPU 31 in step 11 causes the pulse distributor 34 to output to the drive circuit 41 drive pulses of the frequency corresponding to the rapid infeed rate, until the wheel head 13 reaches a rapid infeed end position designated by the decoded instruction.

When the wheel head 13 reached the rapid infeed end position, the CPU 31 still in step 11 decodes a rough infeed instruction of the numerical control program and causes the pulse distributor 34 to output drive pulses of the frequency corresponding to a rough grinding infeed rate designated in the rough infeed instruction. The probes 24a of the measuring device 24 are brought into engagement with a workpiece portion Wa being ground of the workpiece W, whereby the diameter of the same is measured in in-process. The measured signal is converted by the A-D converter 35 to be input to the CPU 31.

As soon as the diameter of the workpiece portion Wa which is being measured by the measuring device 24 reaches the calculated rough grinding end diameter D1 (i.e., when Yes is answered in a judgment step 12), the CPU 31 advances its processing to step 13 to calculate a residual grinding amount Z1. The residual grinding amount Z1 is calculated from the difference between the actual diameter of the workpiece portion Wa measured by the measuring device 24 and the nominal diameter of that workpiece portion Wa from the actual position of the wheel head 13 detected by the position detector 25 when the actual diameter reaches the calculated rough grinding end diameter D1.

The nominal diameter B1 of the workpiece portion Wa is calculated by the following equation from the actual (measured) position S1 of the wheel head 13 upon completion of the rough grinding step and the diameter of the grinding wheel 19.

$$B1 = 2S1 - R \qquad (2)$$

In this equation, R represents the diameter (a known value) of the grinding wheel 19 kept stored in the data memory area of the memory 32 which diameter is updated each time the grinding wheel 19 is subjected to a truing or dressing operation.

Therefore and because the measured diameter is assumed to be equal to the rough grinding end diameter D1 of the workpiece portion Wa, the residual grinding amount Z1 is calculated by the following equation.

$$Z1 = D1 - B1 \qquad (3)$$

In successive step 14, the CPU calculates a back-off position F2 to which the wheel head 13 is to go back after the rough grinding step, and causes the wheel head 13 to retract such a back-off position F2. The back-off position F2 is calculated in a manner as described hereinafter.

That is, since the residual grinding amount at the end of each of the rough, fine and finish grinding steps is in proportion to the infeed amount of the grinding wheel 19 per workpiece rotation in that grinding step, it is presumed that the ratio of the residual grinding amount to the wheel infeed amount per workpiece rotation in each grinding step is constant. Such presumption can therefore be expressed by the following equation (4).

$$(Z1-\alpha)/U1 = (Z2-\alpha)/U2 = (Z3-\alpha)/U3 \qquad (4)$$

Where:

Z1, Z2 and Z3 respectively represent the residual grinding amounts in workpiece diameter upon completions of rough, fine and finish grinding steps; and α represents an error factor in workpiece diameter caused by thermal expansion between workpiece W and wheel head 13 and by wear of grinding wheel 19.

Taking as Y2 the residual grinding amount which is estimated upon completion of the fine grinding step performed in successive to the aforementioned rough grinding step, and also taking as X3 the residual grinding amount which has been calculated upon completion of the finish grinding step previously performed for the preceding workpiece or portion, the aforementioned equation (4) is represented by the following equation (5).

$$(Z1-\alpha)/U1 = (Y2-\alpha)/U2 = (X3-\alpha)/U3 \qquad (5)$$

The estimated value Y2 of the residual grinding amount upon completion of the subsequent fine grinding step is calculated by the following equation (6) to which the equation (5) is transformed to eliminate the error factor α.

$$Y2 = (Z1 \cdot U2 + (X3 \cdot U1 - Z1 \cdot U3) \cdot (U1-U2)/(U1-U3))/U1 \qquad (6)$$

The back-off position F2 to which the wheel head 13 is to be retracted after the preceding rough grinding step is calculated from the following equation (7) using the estimated value Y2.

$$F2 = E2 - Y2/2 \qquad (7)$$

Where E2 represents the position of the wheel head 13 which corresponds to the diameter of the workpiece portion Wa measured by the measuring device 24 upon completion of the rough grinding step. The wheel head position E2 at this time is calculated by the following equation (8) based upon the workpiece diameter D1 (calculated by the equation (1)) at the end of the rough grinding step and the known value R of the wheel diameter.

$$E2 = (D1+R)/2 \qquad (8)$$

Figures 5A, 5B:
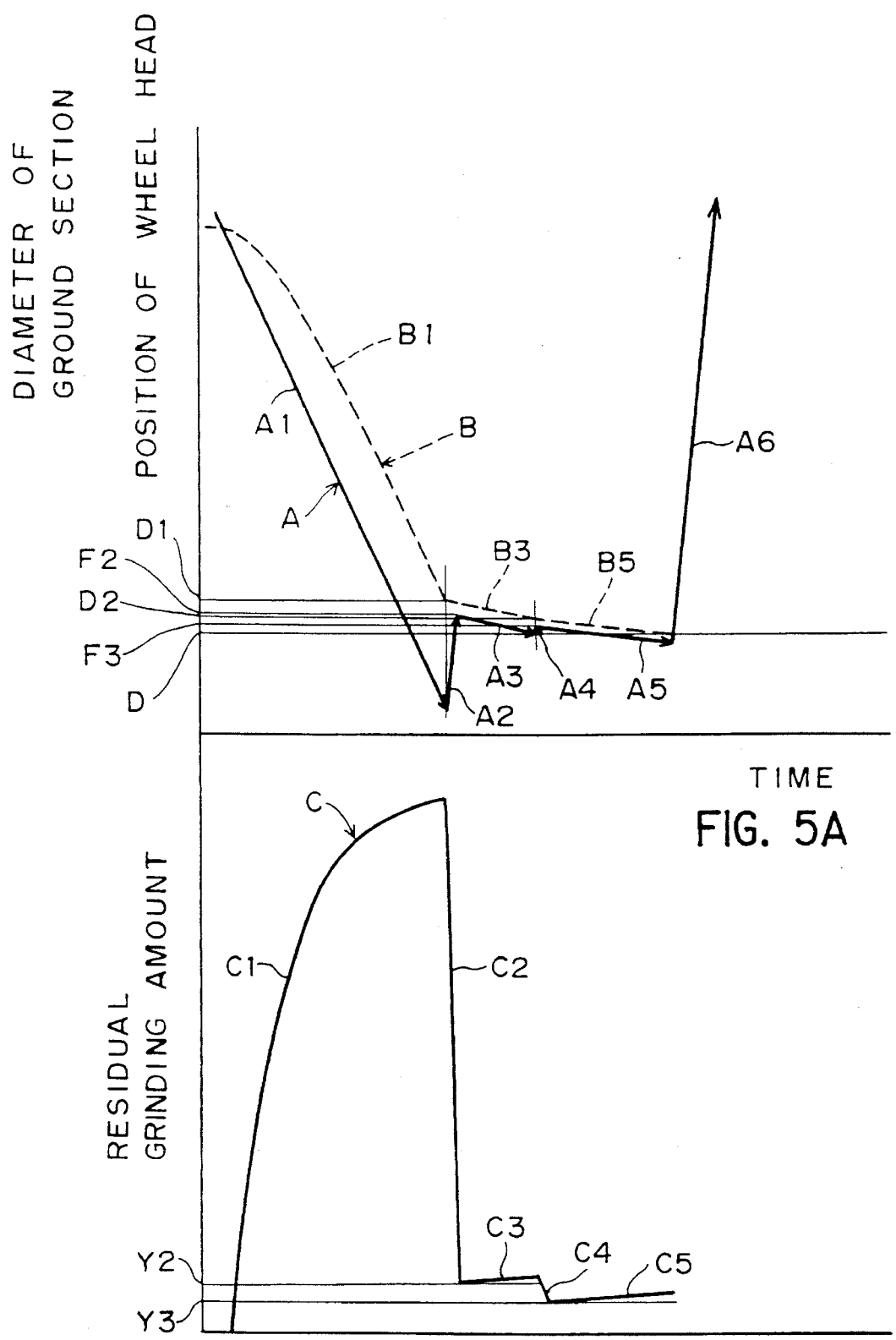
FIG. 5 is an explanatory chart showing the relationship between the position of a wheel head, the diameter of a workpiece and the residual grinding amount according to the present invention.

Still in step 14, the CPU 31, when completing the calculation of the back-off position F2, causes the wheel head 13 to retract to the calculated back-off position F2, as shown by the solid-line A1 in FIG. 5.

The movement of the wheel head 13 in the aforementioned steps 10 through 14 will now be described in more detail with reference to FIG. 5. In FIG. 5, the solid-line A represents the position of the wheel head 13 detected by the position detector 25, and the broken-line B represents the position of the wheel head 13 which is calculated by the use of the equation (8) from the actual diameter of the workpiece portion Wa. In the rough grinding step, the absolute value indicative of the wheel head position is rapidly decreased because of the rough grinding infeed rate as represented by the solid-line A1, while the corresponding nominal value indicative of the wheel head position which value is calculated by the equation (8) based upon the measured diameter of the workpiece portion Wa is decreased because of bending of the workpiece W, as represented by the broken-line B1. In this situation, the residual grinding amount due to the bending of the workpiece W and deformation of the supporting member thereof which are caused by the grinding resistance, rapidly increases as represented by the solid-line C1. When the diameter of the workpiece portion Wa reaches the rough grinding end diameter D1 calculated in step 10, the wheel head 13 is retracted to the back-off position F2 as represented by the solid-line A2. As a consequence, the residual grinding amount is rapidly decreased and hence, would come to coincidence with the estimated residual grinding amount Y2 which the workpiece portion Wa would have upon completion of the subsequent fine grinding step, as represented by the solid-line C2. In this state, since the bending of such a magnitude only that is necessary for the fine grinding step is been given to the workpiece W, the diameter of the workpiece portion Wa is diminished at a moment that the wheel head 13 begins to be advanced at the fine grinding infeed rate.

Figure 1:
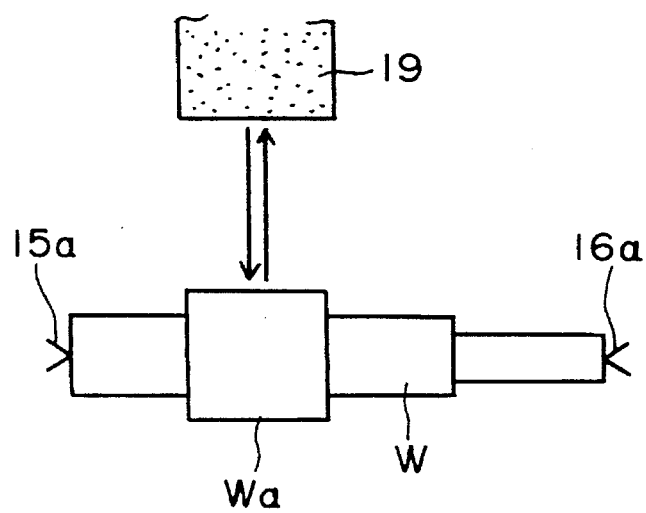
FIG. 1 is an explanatory view showing a conventional way of grinding a cylindrical workpiece.
Figure 6:
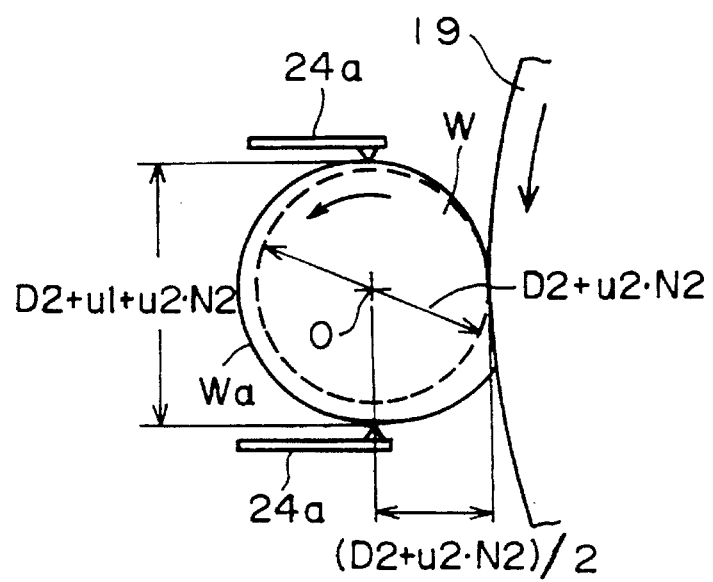
FIG. 6 is an explanatory view showing the relationship between the diameter of the workpiece, the measured diameter thereof, and the infeed amount of the wheel head per workpiece rotation.
Figures 2A, 2B:
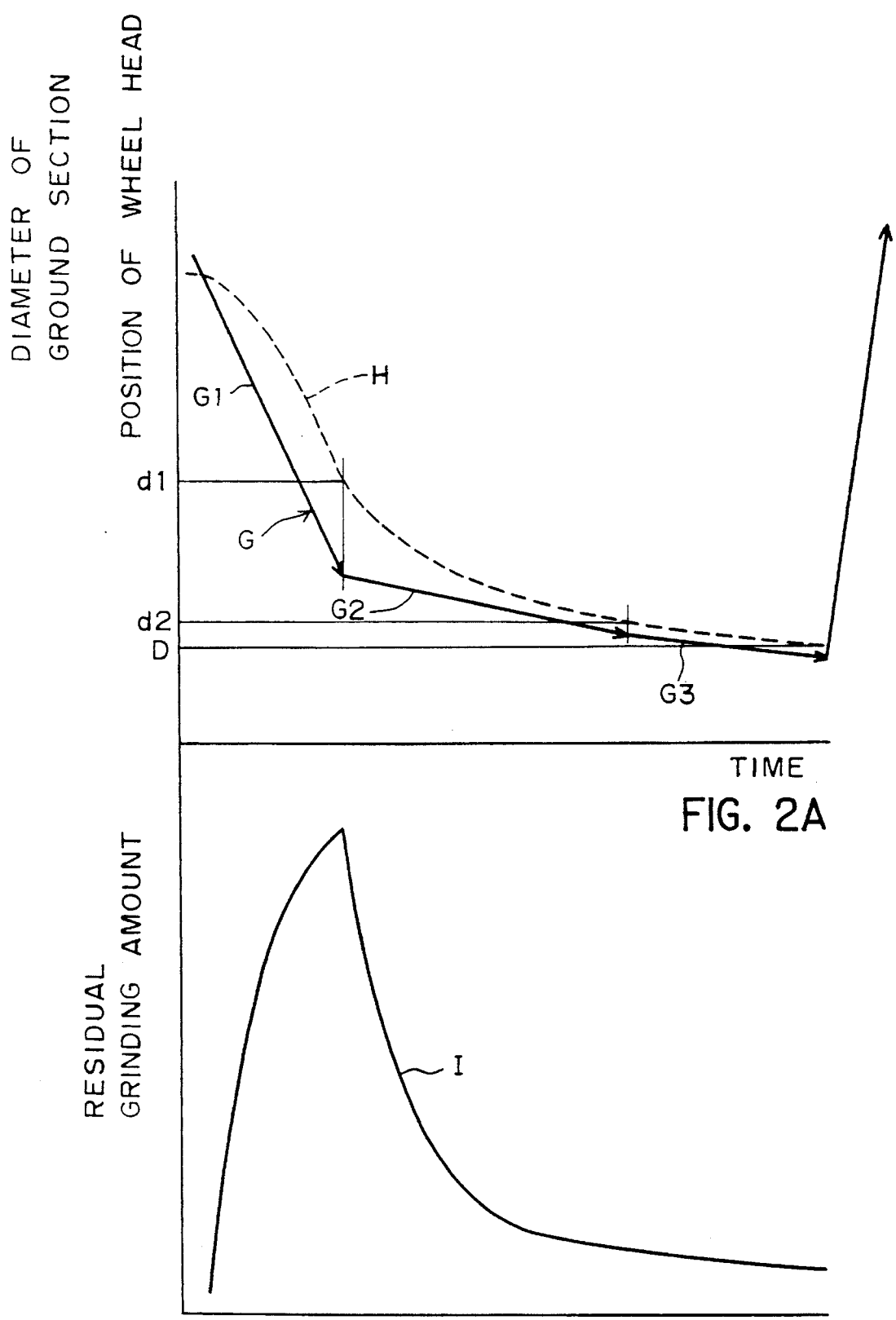
FIG. 2 is an explanatory chart showing the relationship between the position of a wheel head, the diameter of a workpiece and the residual grinding amount.

At the moment that the measuring device 24 issues a signal indicative of the rough grinding end diameter D1 (=D+U1·1+U2·N2+U2·1+U3·N3=D2+U1·1+U2·N2), the profile of the workpiece portion Wa is of spiral as shown exaggeratively in FIG. 6. At this moment, the distance between the rotational axis O of the workpiece W and the grinding point of the grinding wheel 19 is (D2+U2·N2)/2. In order to form the workpiece portion Wa into a true circle represented by the broken-line, when the grinding step (spark-out grinding) is continued with the infeed movement of the wheel head 13 being discontinued in response to the signal from the measuring device 24, the diameter of the true circle comes to D2+U2·N2. In the progress that the workpiece portion Wa is brought into the true circle, infeed amount against the workpiece portion Wa is gradually decreased as the rotational angle of the workpiece W advances from the state in FIG. 6. In this embodiment shown, the average of the infeed amount during the deformation to the true circle is a half of the infeed amount U2 which is given to the grinding wheel 19 per workpiece rotation in the successive fine grinding step. Strictly speaking, since the rough grinding end diameter D1 of the workpiece portion Wa is a value which adds to the fine grinding end diameter D2 the infeed amount U1·1 necessary to correct the spiral profile thereof to the true circle and the grinding amount U2·N2 in the successive fine grinding step, the grinding amount to a value for the fine grinding step can be shortened as small as possible. Although it is practical that the rough grinding end diameter D1 in the equation (1) is a value which adds to D2+U2·N2 (the fine grinding end diameter D2 plus fine grinding amount) the twofold value of the average grinding amount which is necessary to correct the spiral profile of the workpiece portion Wa to the true circle, the average infeed amount does not need to be just half of the fine infeed amount U2. It may be approximately half of the fine infeed amount U2 or larger.

Referring back to the flowchart shown in FIG. 4, as soon as the wheel head 13 reaches the back-off position F2, the CPU 31 in step 15 calculates the fine grinding end diameter D2 by the following equation.

$$D2 = D + U2 \cdot 1 + U3 \cdot N3 \tag{9}$$

Where D, U2, U3 and N3 have been described earlier.

After the calculation of the fine grinding end diameter D2, the CPU 31 in step 16 causes the wheel head 13 to advance from the back-off position F2 for the fine grinding step. When the diameter of the workpiece portion Wa measured by the measuring device 24 reaches the fine grinding end diameter D2 calculated in step 15, the CPU in step 17 judges that the fine grinding step has been completed. Then, the CPU 31 advances the control processing to step 18, wherein the residual grinding amount Z2 at the end of the fine grinding step is calculated in the same manner described above. Namely, the residual grinding amount Z2 is calculated by the following equation (10) based upon the fine grinding end diameter D2 and a nominal diameter B2 to which the wheel head position at the end of the fine grinding step is converted.

$$Z2 = D2 - B2 \tag{10}$$

In successive step 19, the CPU calculates another back-off position F3 to which the wheel head 13 is to be retracted upon completion of the fine grinding step and then, causes the wheel head 13 to retract thereto. The back-off position F3 is calculated in the manner similar to the aforementioned calculation for the back-off position F2, and is calculated by the following equation (11).

$$(Z1-\alpha)/U1 = (Z2-\alpha)/U2 = (Y3-\alpha)/U3 \tag{11}$$

An estimated value Y3 of the residual grinding amount upon completion of the subsequent finish grinding step is calculated by the following equation (12) which is transformed from the equation (11) to eliminate the error factor $\alpha$.

$$Y3 = (Z1 \cdot U3 + (Z2 \cdot U1 = Z1 \cdot U2) \cdot (U1 = U3)/(U1 = U2))/U1 \tag{12}$$

In this calculation, the residual grinding amounts Z1 and Z2 respectively at the ends of the rough and fine grinding steps are used as those values calculated in steps 13 and 18. In step 19, the back-off position F3 of the wheel head 13 is then calculated from the following equation (13) using the estimated value Y3.

$$F3 = E3 - Y3/2 \tag{13}$$

Where E3 represents the wheel head position which corresponds to the diameter of the workpiece portion Wa measured by the measuring device 24 upon completion of the fine grinding step. The wheel head position E3 at this time is calculated by the following equation (14) based upon the workpiece diameter D2 (calculated by the equation (9) at the end of the fine grinding step and the known value of the wheel diameter.

$$E3 = (D2+R)/2 \tag{14}$$

Still in step 19, the CPU 31 causes the wheel head 13 to retract to the back-off position F3.

The movement of the wheel head 13 in the aforementioned steps 15 through 19 will be in more detail with reference again to FIG. 5. In the fine grinding step, the absolute value indicative of the wheel head position which is detected by the position detector 25 is gradually diminished from that of back-off position F2 because of a slow infeed rate as represented by the solid-line A3, while the absolute value indicative of the corresponding nominal wheel head position which is calculated from the diameter of the workpiece portion Wa being measured by the measuring device 24 is gradually decreased as the fine grinding proceeds, as represented by the broken-line B3. As described above, since the fine grinding amount is chosen as small as possible, the fine grinding time taken until the diameter of the workpiece portion Wa reaches the fine grinding end diameter D2 calculated in step 15 can advantageously be shortened. Further, since the residual grinding amount that the workpiece portion Wa has at the very beginning of the fine grinding step coincides with the estimated value Y2 of the residual grinding amount which predicted by upon completion of the rough grinding step, it can be saturated to a substantially constant value within a short period for the fine grinding step, without varying workpiece by workpiece as represented by the solid-line C3. When the diameter of the workpiece portion Wa reaches the fine grinding end diameter D2, the wheel head 13 is retracted to the back-off position F3 as represented by the solid-line A4. At that time, the residual grinding amount is rapidly decreased as represented by the solid-line C4 and hence, would come to the coincidence with the estimated value Y3 of that residual grinding amount. As a result, since the bending necessary for the subsequent finish grinding step remains given to the workpiece W, it is possible to diminish the workpiece diameter at a moment that the wheel head 13 is advanced for the finish grinding.

Upon completion of the fine grinding step, the diameter of the workpiece portion Wa which is measured by the measuring device 24 indicates the fine grinding end diameter D2 (=D+U2·1+U3·N3), and the workpiece portion Wa has a spiral profile like that exaggeratively shown by the solid-line in FIG. 6 in which case the degree of spiral is quiet small compared that shown therein. The diameter D2 of the workpiece portion Wa which has upon completion of the fine grinding step is a value which is result of the addition between the target finish diameter D, the infeed amount U2 necessary for correction of spiral profile to a true circle, and the finish grinding amount U3·N3 to reach the target finish diameter D. This permits the finish grinding amount to be chosen as small as possible.

Referring back to the flowchart shown in FIG. 4, the CPU 31 in step 19 causes the wheel head 13 to further advance from the back-off position F3 for the finish grinding step. In the finish grinding step, the absolute value indicative of the wheel head position is more gradually diminished from that back-off position F3 at a slower infeed rate, as represented by the solid-line A5, while the corresponding nominal value indicative of the wheel head position in dependent on the measured workpiece diameter is diminished as well, as represented by the broken-line B5. When the diameter of the workpiece portion Wa reaches the target finish diameter D, the CPU in step 21 judges that the finish grinding step is completed. Then, the CPU 31 moves to step 22 so as to calculate the residual grinding amount Z3 at the end of the finish grinding step for use in the next grinding operation for the next workpiece or next workpiece portion of the same workpiece. The manner for calculating the residual grinding amount Z3 is same that described above, namely, the residual grinding amount Z3 is calculated by the following equation (14) based upon the target finish diameter D and a nominal workpiece diameter B3 to which the wheel head position at the end of the finish grinding step is converted.

$$Z3=D-B3 \qquad (14)$$

Next, in step 23, the CPU 31 finally causes the wheel head 13 to retract as represented by the solid-line A6 in FIG. 5, whereby the machining cycle for one workpiece portion is completed.

As described above, since the finish grinding amount is chosen as small as possible, the finish grinding time taken until the diameter of the workpiece portion Wa reaches the target finish diameter D can be shortened substantially. Further, since the residual grinding amount that the workpiece portion Wa has at the very beginning of the finish grinding step coincides with the estimated value Y3 of the residual grinding amount which is predicted by calculation upon completion of the fine grinding step, it can be saturated precisely to a constant value without varying workpiece by workpiece, as represented by the solid-line C5.

In this embodiment, the residual grinding amounts in the fine and finish grinding steps tend to increase gradually rather than those which are estimated prior to the execution of the grinding steps, as represented by the solid-lines C3 and C5, respectively. However, this depends on what amounts are set as back-off amounts in the rough and fine grinding steps. Namely, if the back-off amount is set larger, the estimated value of the residual grinding amount at the very beginning of each grinding step is calculated a smaller value, so that the residual grinding amount during that grinding step tends to increase further. To the contrary, if the back-off amount is set smaller, the estimated value of the residual grinding amount at the very beginning of each grinding step is calculated as a larger value, so that the residual grinding amount during that grinding step tends to decrease further.

Although in the embodiment, the grinding step prior to the finish grinding step is divided to two of the rough and fine grinding step, it is possible to omit the fine grinding step.

Also in this embodiment, the back-off position, e.g., F2 of the wheel head 13 is calculated in accordance with, e.g., the equation (7), by subtracting the estimated value Y2 of the residual grinding amount that workpiece would have upon completion of a successive grinding step, from the corresponding nominal value indicative of the wheel head position to which the diameter of the workpiece portion Wa measured by the measuring device 24 is converted. In a modified form of the present invention, the back-off position may be calculated in any other way. For example, the back-off position may be determined as a nominal position at which the wheel head would be when a workpiece portion is ground to a programmed diameter with the workpiece portion rotating about its ideal axis without being subjected to bending. In a further modified form, to give the workpiece portion a certain degree of residual grinding amount at the very beginning of a next grinding step, the back-off position may be determined as a position that is smaller by a certain amount than such a nominal position determined as above. This certain amount may be a residual grinding amount that the workpiece would have at the end of a subsequent grinding step.

Obviously, numerous modifications and variations of the present invention are possible in light of the above teachings. It is therefore to be understood that within the scope of the appended claims, the present invention may be practiced otherwise than as specifically described herein.

What is claimed is:

1. A grinding method wherein a rotating workpiece and a rotating grinding wheel are relatively moved toward and away from each other and wherein at least first and second grinding steps are performed successively at high and low infeed rates respectively for grinding said workpiece, said method comprising the steps of:

(1) measuring the diameter of said workpiece during said grinding steps;

(2) detecting the infeed position of said grinding wheel relative to said workpiece during said grinding steps;

(3) effecting said first grinding step;

(4) calculating a back-off position at the end of said first grinding step, said back-off position being calculated based upon the relative position between said grinding wheel and said workpiece detected at the end of said first grinding step and the diameter of said workpiece measured at the end of said first grinding step;

(5) moving said grinding wheel and said workpiece away from each other to locate one of said grinding wheel and said workpiece to said calculated back-off position; and (6) effecting said second grinding step.

2. A grinding method according to claim 1, wherein said back-off position is so determined that a large bending which said workpiece has at the end of said first grinding step is substantially eliminated, but a smaller bending would remain given to said workpiece from the very beginning of said second grinding step.

3. A grinding method according to claim 1, wherein said workpiece is rotatable about a fixed axis thereof while said grinding wheel is movable toward and away from said workpiece and wherein said step (4) for calculating said back-off position includes the steps of:

(4-1) converting the position of said grinding wheel at the end of said first grinding step into a nominal workpiece diameter;

(4-2) calculating the difference between said nominal workpiece diameter and the diameter measured at the end of said first grinding step; and (4-3) determining said back-off position as a position which is less remote by a certain value from the position at which said grinding wheel is positioned at the end of said first grinding step.

4. A grinding method according to claim 3, said certain value indicates the amount of bending which said workpiece would have at the end of said second grinding step.

5. A grinding method wherein a rotating workpiece and a rotating grinding wheel are relatively moved toward and away from each other and wherein at least first, second and third grinding steps are performed successively at high, medium and low infeed rates respectively for grinding said workpiece, said method comprising the steps of:

(1) measuring the diameter of said workpiece during said grinding steps;

(2) detecting the infeed position of said grinding wheel relative to said workpiece during said grinding steps;

(3) effecting said first grinding step for performing the rough grinding of said workpiece;

(4) calculating a first amount which is left unground due to the bending of said workpiece, based upon the diameter of said workpiece at the end of said first grinding step and the position of said grinding wheel relative to said workpiece at the end of said first grinding step;

(5) estimating a second amount which would be left unground at the end of said second grinding step, based upon said first amount and a third amount which has been detected and stored at the end of said third grinding step for a preceding workpiece portion;

(6) calculating a first back-off position from said first and second amounts at the end of said first grinding step;

(7) moving said grinding wheel and said workpiece away from each other to locate one of said grinding wheel and said workpiece to said calculated first back-off position;

(8) effecting said second and third grinding steps in turn; and (9) calculating said third amount which is left unground due to the bending of said workpiece at the end of said third grinding step, so as to store said calculated third amount for use in estimating said second amount relating to a successive workpiece.

6. A grinding method according to claim 5, wherein said workpiece is rotatable about a fixed axis thereof while said grinding wheel is movable toward and away from said workpiece and wherein said first back-off position is determined to retract said grinding wheel by a distance of said first amount less said second estimated amount prior to said second grinding step.

7. A grinding apparatus wherein a rotating workpiece and a rotating grinding wheel are relatively moved toward and away from each other and wherein at least first and second grinding steps are performed successively at high and low infeed rates respectively for grinding said workpiece, said apparatus comprising:

measuring means for measuring the diameter of said workpiece during said grinding steps;

detection means for detecting the infeed position of said grinding wheel relative to said workpiece during said grinding steps;

feed control means for effecting said first and second grinding steps;

back-off position calculation means for calculating a back-off position at the end of said first grinding step, based upon relative position of said grinding wheel and said workpiece detected at the end of said first grinding step and the diameter of said workpiece measured at the end of said first grinding step; and wherein upon completion of said grinding step, said feed control means causes said grinding wheel and said workpiece to move away from each other to locate one of said grinding wheel and said workpiece to said calculated back-off position and then, effects said second grinding step.

8. A grinding apparatus according to claim 7, wherein said back-off position calculation means so determines said back-off position that a large bending which said workpiece has at the end of said first grinding step is substantially eliminated, but a smaller bending would remain given to said workpiece from the very beginning of said second grinding step.

9. A grinding apparatus according to claim 7, wherein said workpiece is rotatable about a fixed axis thereof while said grinding wheel is movable toward and away from said workpiece and wherein said back-off position calculation means further comprising:

conversion means for converting the position of said grinding wheel at the end of said first grinding step into a nominal workpiece diameter;

difference calculation means for calculating the difference between said nominal workpiece diameter and the diameter measured at the end of said first grinding step; and determination means for determining said back-off position as a position which is less remote by a certain value from the position at which said grinding wheel is positioned at the end of said first grinding step.

10. A grinding apparatus according to claim 9, said certain value indicates the amount of bending which said workpiece would have at the end of said second grinding step.

11. A grinding apparatus wherein a rotating workpiece and a rotating grinding wheel are relatively moved toward and away from each other and wherein at least first, second and third grinding steps are performed successively at high, medium and low infeed rates respectively for grinding said workpiece, said apparatus comprising:

measuring means for measuring the diameter of said workpiece during said grinding steps;

detection means for detecting the infeed position of said grinding wheel relative to said workpiece during said grinding steps;

feed control means for effecting said first, second and third grinding steps for performing the grinding of said workpiece;

first calculation means for calculating a first amount which is left unground due to the bending of said workpiece, based upon the diameter of said workpiece at the end of said first grinding step and the position of said grinding wheel relative to said workpiece at the end of said first grinding step;

second calculation means for calculating a third amount which is left unground due to the bending of said workpiece at the end of said third grinding step, so as to store said calculated third amount for use in estimating a second amount relating to a successive workpiece;

prediction means for estimating said second amount which would be left unground at the end of said second grinding step, based upon said first amount and said third amount which has been detected and stored by said second calculation means at the end of said third grinding step for a preceding workpiece portion;

back-off position calculation means for calculating a first back-off position from said first and second amounts at the end of said first grinding step; and wherein upon completion of said first grinding step, said feed control means causes said grinding wheel and said workpiece to move away from each other to locate one of said grinding wheel and said workpiece to said calculated first back-off position and then, effects said second and third grinding steps in turn.

12. A grinding apparatus according to claim 11, wherein said workpiece is rotatable about a fixed axis thereof while said grinding wheel is movable toward and away from said workpiece and wherein said first back-off position calculation means determined said back-off position so as to retract said grinding wheel by a distance of said first amount less said second estimated amount prior to said second grinding step.

* * * * *